United States Patent
Yang et al.

(10) Patent No.: US 8,384,262 B2
(45) Date of Patent: Feb. 26, 2013

(54) MOTOR ROTOR AND A MOTOR HAVING THE SAME

(75) Inventors: Shih-Jen Yang, Taipei (TW); Hung-Sen Tu, Taipei (TW); Chen-Chia Yang, Taipei (TW)

(73) Assignee: Fairchild Semiconductor Incorporated, Taipei (TW)

( * ) Notice: Subject to any disclaimer, the term of this patent is extended or adjusted under 35 U.S.C. 154(b) by 124 days.

(21) Appl. No.: 12/818,134

(22) Filed: Jun. 17, 2010

(65) Prior Publication Data

US 2011/0309705 A1 Dec. 22, 2011

(51) Int. Cl.
*H02K 1/27* (2006.01)

(52) U.S. Cl. ......... 310/156.25; 310/156.01; 310/156.45; 310/67 R

(58) Field of Classification Search .......... 310/156.01–156.84, 67 R
See application file for complete search history.

(56) References Cited

U.S. PATENT DOCUMENTS

| | | | | |
|---|---|---|---|---|
| 4,769,567 | A | * | 9/1988 | Kurauchi et al. ........ 310/156.45 |
| 6,081,058 | A | * | 6/2000 | Suzuki et al. ............ 310/156.45 |
| 6,380,646 | B1 | * | 4/2002 | Bernauer et al. .......... 310/49.42 |
| 7,541,713 | B2 | * | 6/2009 | Cheng .................... 310/216.123 |
| 2005/0225194 | A1 | * | 10/2005 | Murakami et al. ............ 310/216 |
| 2006/0255668 | A1 | * | 11/2006 | Chen et al. .................. 310/67 R |
| 2007/0090710 | A1 | * | 4/2007 | Chen ........................ 310/156.26 |
| 2007/0132323 | A1 | * | 6/2007 | Park ............................ 310/67 R |
| 2008/0157619 | A1 | * | 7/2008 | Wu et al. .................. 310/156.48 |

* cited by examiner

*Primary Examiner* — Quyen Leung
*Assistant Examiner* — Leda Pham

(57) ABSTRACT

A motor rotor includes an annular body and a plurality of magnetic bodies installed on an inner lateral surface of the annular body in an irregular manner, to prevent a rotating motor from generating a cogging effect, disperse the frequency of the cogging torque, and reduce the amplitude. Accordingly, noises generated while the motor is operating are reduced, the periodicity of a cogging torque is changed, and cogging torque is reduced.

10 Claims, 5 Drawing Sheets

MOTOR ROTOR AND A MOTOR HAVING THE SAME

BACKGROUND OF THE INVENTION

1. Field of the Invention

This invention relates to motor rotors, and, more particularly, to a motor rotor that reduces noises generated by a cogging torque and a motor having the motor rotor.

2. Description of Related Art

Electrical motors are applied to numerous kinds of products. In general, a motor forms an inductive magnetic field by using electrical current. The inductive magnetic field interacts with an inner permanent magnet to generate rotational movement. In addition to providing the rotational movement, the motor may also output rotational mechanical energy that may be converted into a linear or vibrating movement by certain mechanisms.

FIG. 1A (PRIOR ART) provides an oblique view of an outer rotor motor according to the prior art. Referring to FIG. 1A (PRIOR ART), the outer rotor motor comprises a stator 11 installed in the central region and a rotor 12 surrounding the outer circumference of the stator 11. The stator 11 is a stationary part. The stator 11 comprises field coils 111, and generates a magnetic field by inputting currents into the field coils 111. The rotor 12 includes an annular body 121 and a plurality of permanent magnets 122 installed on an inner lateral surface of the annular body 121. The permanent magnets 122 provides another magnetic field. The rotor 12 generates rotational movement according to interaction of the two magnetic fields.

FIG. 1B (PRIOR ART) provides a top view of the outer rotor motor shown in FIG. 1A (PRIOR ART). Referring to FIG. 1B (PRIOR ART), the permanent magnets 122 are arranged on the inner lateral surface 123 of the annular body 121 spaced at an equal interval.

However, the equal interval arrangement of the permanent magnets results in a cogging effect and cogging torque while a motor is rotating. Since the permanent magnets are arranged at an equal interval, the cogging torque has a constant frequency and amplitude (as shown in FIG. 1C (PRIOR ART)). If the frequency of the cogging torque is close to a resonance frequency of the motor or something nearby or is within people's hearing range, people will be annoyed by the noises, and the motor is deemed to have poor quality.

Therefore, solving the drawbacks of the prior art motor to reduce the noise generated while the motor is operating is an important goal in the art.

SUMMARY OF THE INVENTION

In view of the above-mentioned problems of the prior art, the present invention provides a motor rotor, including an annular body having an inner lateral surface, and a magnetic body set comprising a plurality of first magnetic bodies installed on the inner lateral surface of the annular body and a plurality of second magnetic bodies installed on the inner lateral surface of the annular body alternating with the first magnetic bodies, a first distance between each of the first magnetic bodies and one of the second magnetic bodies neighboring a first side of the first magnetic body being greater than a second distance between the first magnetic body and another of the second magnetic bodies neighboring a second side of the first magnetic body.

The magnetic body set is locked, riveted or adhered to the annular body. The first magnetic bodies and the second magnetic bodies have different polarities.

In an aspect of the motor rotor of the present invention, the annular body is a steel metal part.

The annular body includes non-magnetoconductive metal or plastic, wherein the non-magnetoconductive metal is one selected from the group consisting of aluminum, copper, zinc, tantalum and stainless steel.

In the aforesaid motor rotor, the first and second magnetic bodies are permanent magnets.

The present invention further provides a motor that comprises a motor rotor and a stator rotating in cooperation with the motor rotor and having a field coil that generates a magnetic field that drives the motor rotor to rotate, the motor rotor including an annular body having an inner lateral surface, and a magnetic body set comprising a plurality of first magnetic bodies installed on the inner lateral surface of the annular body and a plurality of second magnetic bodies installed on the inner lateral surface of the annular body alternating with the first magnetic bodies, a first distance between each of the first magnetic bodies and one of the second magnetic bodies neighboring on a first side of the first magnetic body being greater than a second distance between the first magnetic body and another of the second magnetic bodies neighboring on a second side of the first magnetic body.

From the above, it can be seen that the irregular arrangement of the first and second magnetic bodies on the inner lateral surface of the annular body prevents a rotating motor from generating a cogging effect, disperses the frequency of cogging torque, reduces the amplitude, and reduces noise generated while the motor is operating. Moreover, the period of the cogging torque is changed, and the amplitude of the cogging torque is reduced. Therefore, the motor rotor of the present invention, as compared with the prior art, may reduce the noises generated while a motor is rotating, making the motor run more silently.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention and advantages thereof. These and other advantages and effects can be readily understood by those in the art after reading the disclosure of this specification. The present invention can also be performed or applied by other embodiments. The details of the specification apply to a specific application; however, numerous modifications and variations can be devised without departing from the spirit of the present invention.

Figure 1A:
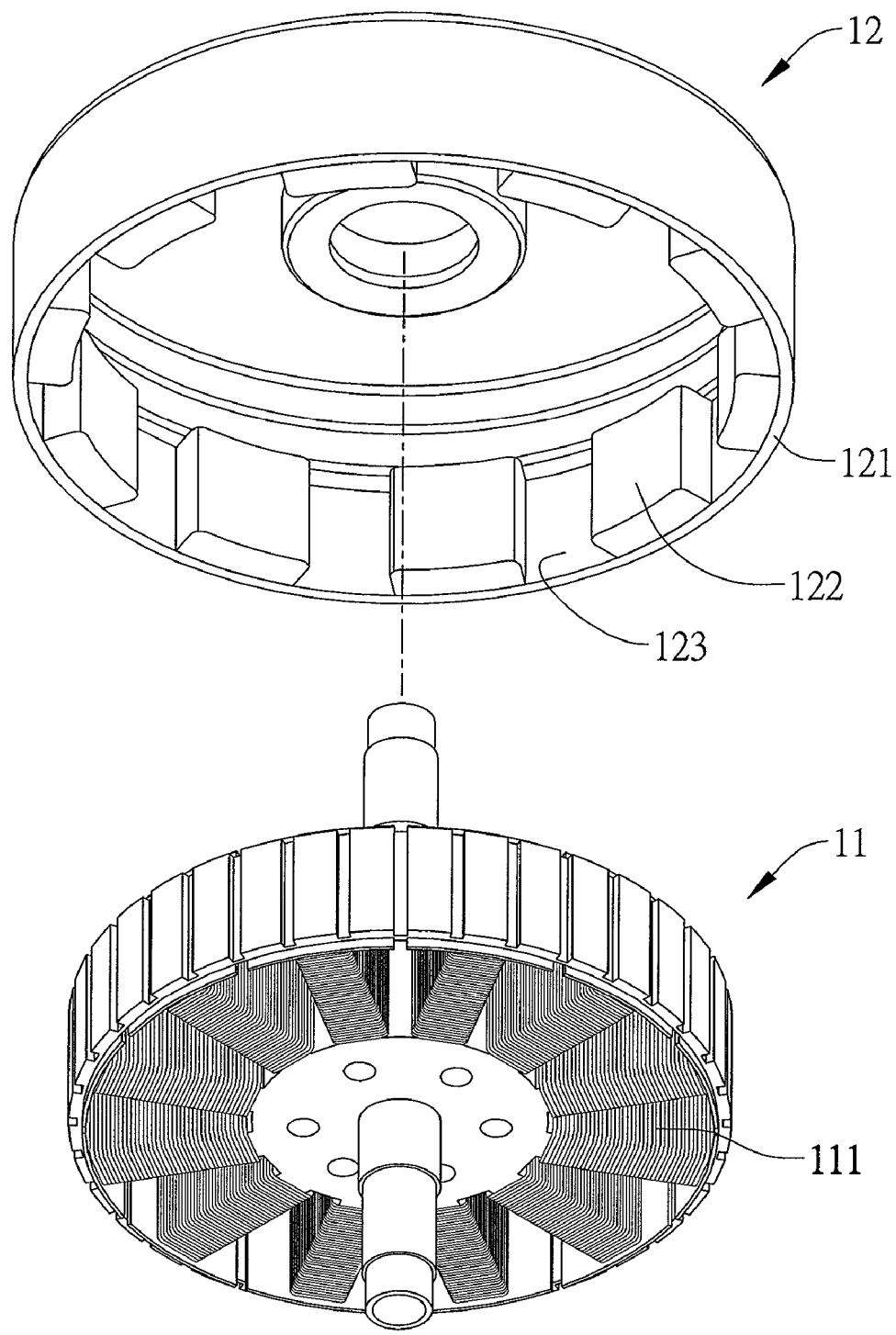
FIG. 1A (PRIOR ART) is an oblique view of an outer rotor motor according to the prior art.
Figure 1B:
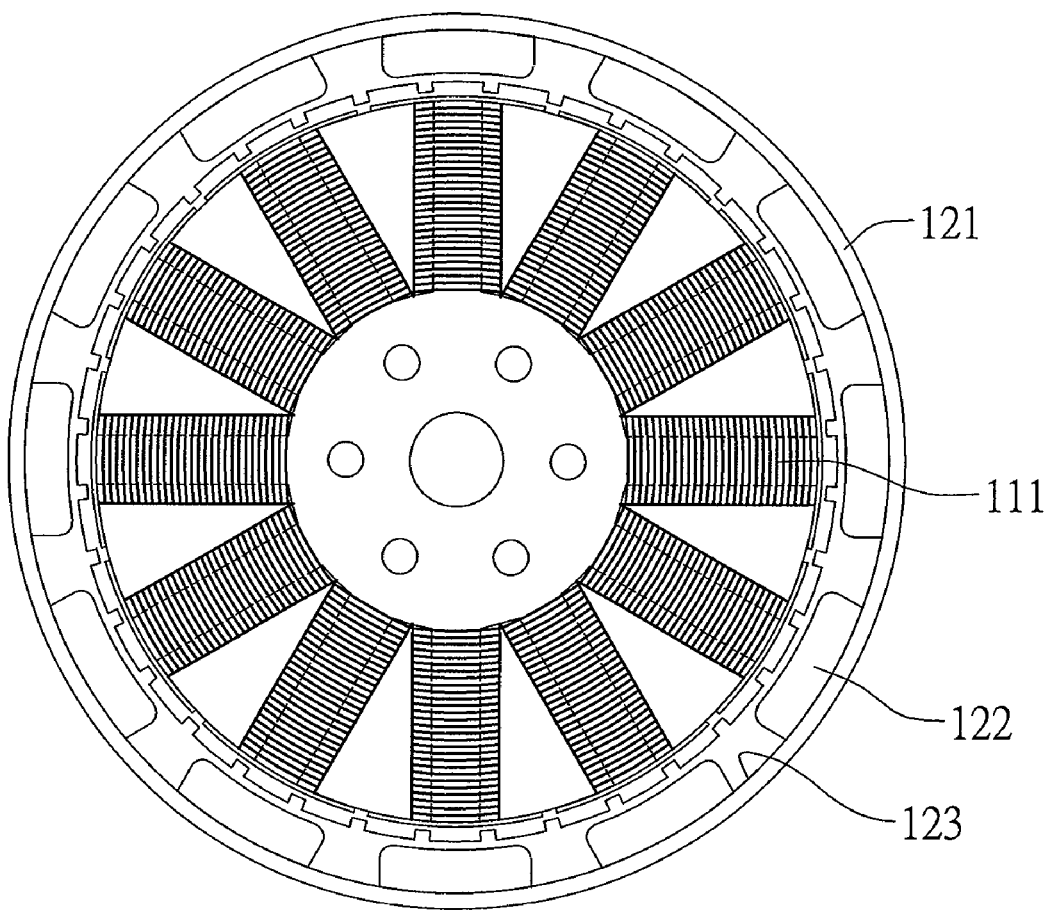
FIG. 1B (PRIOR ART) is a top view of the outer rotor motor shown in FIG. 1A (PRIOR ART)
Figure 1C:
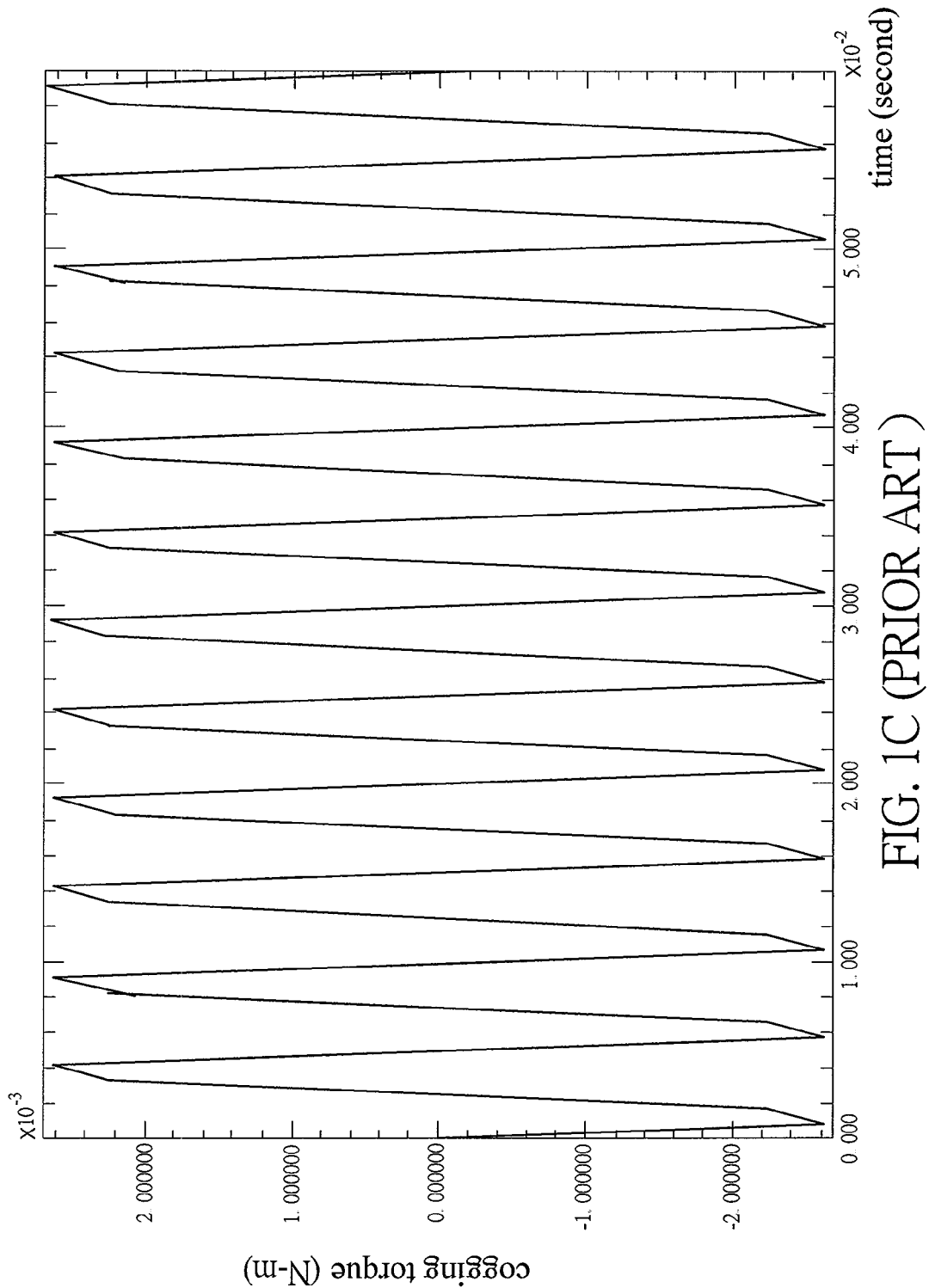
FIG. 1C (PRIOR ART) is a waveform of the cogging torque generated by the outer rotor motor shown in FIG. 1A (PRIOR ART)
Figure 2A:
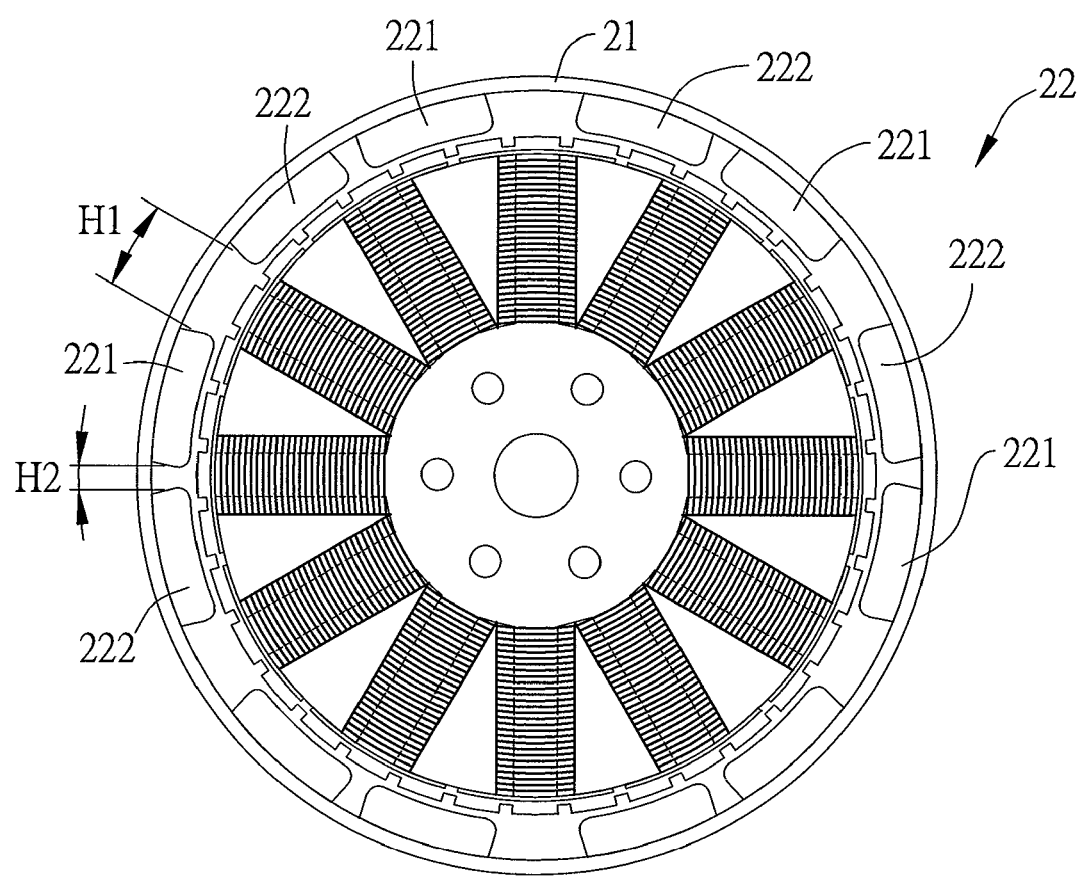
FIG. 2A is a top view of a motor rotor and its corresponding stator according to the present invention.

FIG. 2A is a top view of a motor rotor and its corresponding stator according to the present invention. Referring to FIG. 2A, in the embodiment, the motor rotor of the present invention rotates in cooperation with a stator of a field coil. The field coil generates a magnetic field that drives the motor rotor to rotate.

As shown in FIG. 2A, the motor rotor comprises an annular body 21 and a magnetic body set 22. The annular body 21 has an inner lateral surface. The magnetic body set 22 comprises a plurality of first magnetic bodies 221 installed on the inner lateral surface of the annular body 21 and a plurality of second magnetic bodies 222 installed on the inner lateral surface of the annular body 21 alternating with the first magnetic bodies 221. Note that six first magnetic bodies 221 and six second magnetic bodies 222 are exemplified in the embodiment, and each of the first magnetic bodies 221 and its corresponding second magnetic body 222 form a magnetic body pair. Other embodiments may include any number of first magnetic bodies 221 and second magnetic bodies 222 as per demand, but the first magnetic bodies 221 and the second magnetic bodies 222 have to have opposite polarities, i.e., the north (N) poles of the first magnetic bodies 221 and the south (S) poles of the second magnetic bodies 222 face in the same direction.

In the embodiment, a first distance H1 exists between each of the first magnetic bodies 221 and a second magnetic body 222 neighboring on a first side of the first magnetic body 221 that is greater than a second distance H2 between the first magnetic body 221 and another second magnetic body 222 neighboring on a second side of the first magnetic body 221, so as to prevent a rotating motor from generating a cogging effect, disperse the frequency of cogging torque, and reduce the amplitude. Accordingly, the periodicity of the cogging torque is changed, the amplitude of the cogging torque is reduced, and noises generated while a motor is operating are also reduced.

In the embodiment, the first magnetic bodies 221 and the second magnetic bodies 222 are locked, riveted or adhered to the annular body 21.

In another embodiment, the annular body 21 is a steel metal part. The annular body 21 may include non-magnetoconductive metal or plastic, and the non-magnetoconductive metal is one selected from the group consisting of aluminum, copper, zinc, tantalum and stainless steel. The first magnetic bodies 221 and the second magnetic bodies 222 are permanent magnets.

Figure 2B:
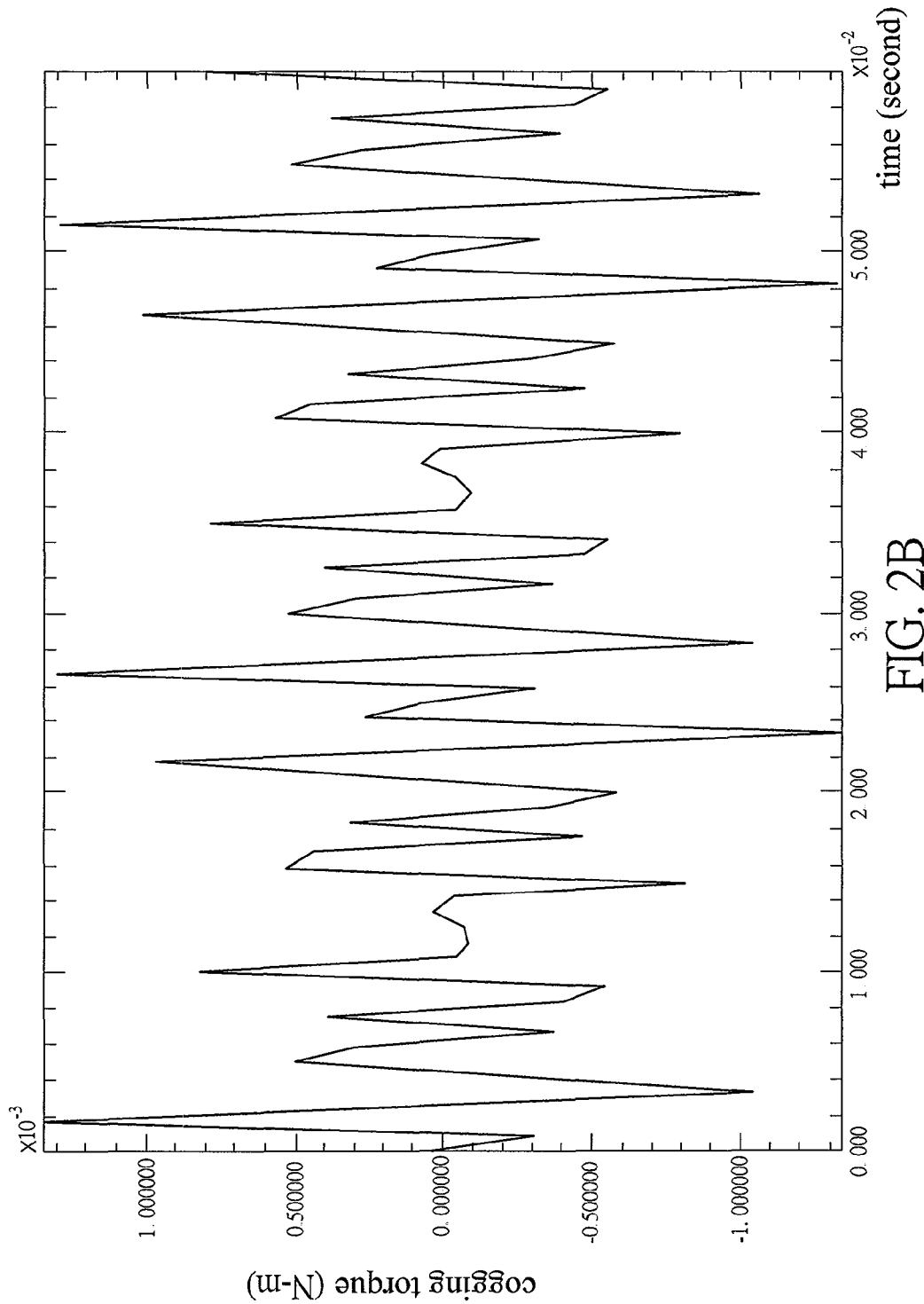
FIG. 2B is a waveform of the cogging torque generated by the motor rotor shown in FIG. 2A.

FIG. 2B is a waveform of a cogging torque generated by the motor rotor shown in FIG. 2A. As shown in FIG. 2B, since each of the first magnetic bodies 221 is separated from its two neighboring second magnetic bodies 222 at different distances, i.e., H1 and H2, the first magnetic bodies 221 and the second magnetic bodies 222 interact with an inner stator magnetic field and exhibit an irregular state, during the period while the motor rotor is rotating. As a result, the plot of the cogging torque is characterized by a frequency that is dispersed with an amplitude that is inconsistent. Compared with the prior art, the cogging torque has a smaller torque value, and the noise generated by the cogging torque is greatly reduced.

Note that the motor rotor of the present invention may be applied to a variety of motors, such as, but not limited to, brushless DC motors (BLDC motor), permanent magnet synchronous motors (PMSM), or ceiling fan motors. A common stator may be installed in a central region. In that the stator is common knowledge in the art, further description is hereby omitted.

In conclusion, the motor rotor of the present invention rotates in cooperation with a stator having a field coil, and the motor rotor has an annular body, and a plurality of magnetic bodies installed on an inner lateral surface of the annular body in an irregular manner, to prevent a rotating motor from generating a cogging effect, disperse the frequency of the cogging torque, and reduce the amplitude. Accordingly, the noises generated while the motor is operating are reduced, the periodicity of cogging torque is changed, and cogging torque is reduced.

The foregoing descriptions of the detailed embodiments are illustrated to disclose the features and functions of the present invention and are not intended to be restrictive of the scope of the present invention. It should be understood by those in the art that many modifications and variations can be made according to the spirit and principles in the disclosure of the present invention and yet fall within the scope of the appended claims.

What is claimed is:

1. A motor rotor, comprising:
   an annular body comprising plastic and having an inner lateral surface; and
   a magnetic body set comprising a plurality of first magnetic bodies installed on the inner lateral surface of the annular body and a plurality of second magnetic bodies installed on the inner lateral surface of the annular body alternating with the first magnetic bodies, a first distance between each of the first magnetic bodies and one of the second magnetic bodies neighboring on a first side of the first magnetic body being greater than a second distance between the first magnetic body and another one of the second magnetic bodies neighboring on a second side of the first magnetic body.

2. The motor rotor of claim 1, wherein the first magnetic bodies and the second magnetic bodies have different polarities.

3. The motor rotor of claim 1, wherein the magnetic body set is locked, riveted or adhered to the annular body.

4. The motor rotor of claim 1, wherein the annular body is a steel metal part.

5. The motor rotor of claim 1, wherein the first and second magnetic bodies are permanent magnets.

6. A ceiling fan motor, comprising:
   a motor rotor including an annular body having plastic and an inner lateral surface, and a magnetic body set comprising a plurality of first magnetic bodies installed on the inner lateral surface of the annular body and a plurality of second magnetic bodies installed on the inner lateral surface of the annular body alternating with the first magnetic bodies, a first distance between each of the first magnetic bodies and one of the second magnetic bodies neighboring on a first side of the first magnetic body being greater than a second distance between the first magnetic body and another of the second magnetic bodies neighboring on a second side of the first magnetic body; and
   a stator rotating in cooperation with the motor rotor, the stator having a field coil that generates a magnetic field that drives the motor rotor to rotate.

7. The ceiling fan motor of claim 6, wherein the first magnetic bodies and the second magnetic bodies have different polarities.

8. The ceiling fan motor of claim 6, wherein the magnetic body set is locked, riveted or adhered to the annular body.

9. The ceiling fan motor of claim 6, wherein the annular body is a steel metal part.

10. The ceiling fan motor of claim 6, wherein the first and second magnetic bodies are permanent magnets.

* * * * *